United States Patent [19]
Vleugels

[11] Patent Number: 5,902,624
[45] Date of Patent: May 11, 1999

[54] METHOD FOR DEPOSITING ASPARTAME ON AN EDIBLE SUPPORT

[75] Inventor: Leopold F. W. Vleugels, Beek, Netherlands

[73] Assignee: Holland Sweetener Company V.o.F., Maastricht, Netherlands

[21] Appl. No.: 08/827,702

[22] Filed: Apr. 9, 1997

[30] Foreign Application Priority Data

Apr. 10, 1996 [BE] Belgium ............... 09600296

[51] Int. Cl.$^6$ ................... A23L 1/236
[52] U.S. Cl. ................... 426/548; 426/289
[58] Field of Search ................... 426/548, 289

[56] References Cited

U.S. PATENT DOCUMENTS

| | | | |
|---|---|---|---|
| 3,868,472 | 2/1975 | Berg et al. | 426/342 |
| 3,922,369 | 11/1975 | Glicksman et al. | 426/548 |
| 4,656,304 | 4/1987 | Oppici et al. | 560/41 |
| 4,695,474 | 9/1987 | Cuneo et al. | 426/579 |
| 4,942,255 | 7/1990 | Takahashi et al. | 560/41 |
| 5,114,726 | 5/1992 | Tsau et al. | 426/289 |
| 5,427,812 | 6/1995 | Hatch et al. | 426/548 |
| 5,582,351 | 12/1996 | Tsau | 241/17 |
| 5,762,992 | 6/1998 | Takeuchi et al. | 426/548 |

FOREIGN PATENT DOCUMENTS

| | | |
|---|---|---|
| 0 109 771 | 5/1984 | European Pat. Off. . |
| 0 197 822 | 10/1986 | European Pat. Off. . |
| 0 320 523 A1 | 6/1989 | European Pat. Off. . |
| 0 701 779 A1 | 3/1996 | European Pat. Off. . |
| 2.222.961 | 10/1974 | France . |
| 35431302 | 5/1987 | Germany . |

OTHER PUBLICATIONS

Chemical Engineers' Handbook, 5$^{th}$ Edition, pp. 21–41, Publ: McGraw Hill Book Co., eds. Peiry et al., 1973.
EP–A1–0691081 (Jan. 1996) (Derwent Abstract).
CH–687292–A5 (Nov. 1996) (Derwent Abstract).
Patent Abstracts of Japan, vol. 8, No. 156 (C–234), Jul. 19, 1984, & JP–A–59 059173.

*Primary Examiner*—Chhaya D. Sayala
*Attorney, Agent, or Firm*—IP Group of Pillsbury Madison & Sutro, LLP

[57] ABSTRACT

Aspartame having particles smaller than 100 μm can be deposited on an edible supporting material, by mixing in a dry form, in amounts that clearly exceed 10 wt. %, if the aspartame has a free bulk density of 350 kg/m$^3$ or lower, and is obtained through, successively, crystallisation from an aqueous medium with forced convection, granulation and subsequent mechanical reduction, the mixing being effected in a weight ratio of aspartame and supporting material of at most 1:1, but not less than 1:30.

16 Claims, No Drawings

METHOD FOR DEPOSITING ASPARTAME ON AN EDIBLE SUPPORT

FIELD OF THE INVENTION

BACKGROUND TO THE INVENTION

The invention relates to a method for depositing on an edible supporting material α-L-aspartyl-L-phenylalanine-methyl ester having a particle size that is in the main smaller than 100 μm, by mixing the α-L-aspartyl-L-phenylalanine-methyl ester and the supporting material in a dry form.

Such a method is known from JP-B-93007983. This Japanese patent describes that fine, powdered α-L-aspartyl-L-phenylalanine-methyl ester (which compound will hereinafter also be referred to as aspartame or as APM) can be homogeneously deposited on the surface of granular sucrose (cane sugar) by mixing the APM and the granular cane sugar. As is apparent from this patent, the APM and granular cane sugar to be used must have particle sizes of less than 100 μm (APM) and in the range of 0.01 to 3 mm (cane sugar), respectively.

The method is however absolutely unsuitable for depositing more than 10 wt. % APM on the cane sugar and is preferably recommended for making products that contain only 0.5 to 5 wt. % APM. In the case of higher APM concentrations in the compositions obtained, a considerable proportion of the APM remains in the composition in a free form. This may be detrimental to the composition's homogeneity and flow properties, which is expressed in a poor angle of repose, and it may also cause dusting problems. Excessive adhesion of APM particles to the walls of the equipment employed and/or packaging materials is also frequently encountered and free APM particles may agglomerate, which has an adverse effect on the dissolution time of the APM in the composition obtained.

α-L-Aspartyl-L-phenylalanine-methyl ester (aspartame; APM) is a dipeptide sweetener with a sweetening power that is about 200× that of sugar. Aspartame is widely used as a sweetener in a wide diversity of edible products, soft drinks, confectionery, medicines and in table sweeteners and the like. APM is often used in the form of dry blends, such as instant powdered drinks and instant dessert products and the like.

The use of APM (and/or of blends thereof with a different sweetener), in particular of powdered APM, is often hampered in terms of handling by the fact that the products in question are insufficiently free of dust (i.e. they contain too many fines), show poor flow behaviour (which may be partly caused by slight electrostatic charging of the products), or have a relatively long dissolution time, for example owing to the formation of agglomerates. Consequently, drawbacks are often experienced in the use of APM in terms of dusting behaviour, undesired adhesion to surfaces of the equipment employed and poor dissolution time of the APM.

To reduce those problems in, for example, the foodstuffs industry efforts have been made to find methods for transforming APM and edible supporting materials (for example citric acid, maltodextrins, etc.) into compositions. According to the above-referenced Japanese paten application, its method proves to be more or less limited in terms of the APM concentrations realisable in the composition (generally to at most 5 wt. %, but to 10 wt. % at the very most). Besides the method from the aforesaid Japanese patent publication, no simple methods for preparing such compositions, or compositions having higher APM concentrations, which do not involve auxiliaries, for example wetting agents, or laborious process steps, have been described or are otherwise known. For example, several publications are known in which compositions of APM and other substances are prepared, also with APM concentrations that are higher than 10 wt. %. According to several of such publications, the greater part of the APM in the resulting product is however not deposited on the supporting material, and hence usually less than 50 wt. % of the APM, but often even less than 15 wt. % of the APM, is bound to the surface of the supporting material, and/or the method involves the use of additives or laborious steps. The following methods can be quoted as examples:

spray drying, or spraying the supporting material with a concentrated APM solution, followed by drying (ZA-9205142);

freeze-drying (U.S. Pat. No. 3,922,369);

mixing with wetting, followed by drying (U.S. Pat. No. 5,114,726);

mixing in the presence of binders, with wetting, followed by drying (JP-A-59059173);

so-called 'high-shear mixing', also known as micro-mixing, i.e. mixing with a high energy input and pulverising conditions (JP-B-89016142); this patent describes that the APM may be homogeneously distributed among the other component or a part thereof, optionally before the high-shear treatment, by mixing in for example a tumbler mixer (becoming surrounded by particles of the other material in the process, so to speak), so as to prevent agglomeration of the APM; however, in this method the APM is certainly not deposited on supporting material, but a physical powder blend is obtained; in spite of claims to the contrary in this patent, segregation problems, etc. remain inherent;

grinding of a blend to obtain a mixed product with a homogeneous particle size distribution (p.s.d.) (NL-A-7404428).

Such methods often require specific equipment or special process control devices and laborious steps and/or steps involving extra risks of decomposition of the thermally relatively sensitive APM. Mixing with high energy input is usually disadvantageous, not only because of the dusting and drifting problems presented by the end products obtained, but also because of the energy consumption involved. Neither do a number of the above methods result in advantages in terms of reduction in the adhesion of the APM to walls and the like.

There is hence a need for a simple and efficient method for converting APM and edible supporting materials, via mixing involving little energy, into a composition in which all or a sufficient amount of the APM, or almost all, that is, at least 50% (a sufficient amount), but preferably at least 85% (almost all), is deposited on the supporting material in amounts that may clearly exceed 10 wt. %, resulting in a homogeneous product with good dissolution and handling properties. It is assumed to be particularly advantageous if the method in question can also be carried out under very dry conditions, for example at a relative humidity of 70% or lower, or using very dry, non-hygroscopic supporting materials.

SUMMARY AND OBJECTS OF THE INVENTION

Surprisingly, it has now been found that α-L-aspartyl-L-phenylalanine-methyl ester having a particle size that is in the main smaller than 100 μm can be deposited on an edible supporting material by mixing the α-L-aspartyl-L-phenylalanine-methyl ester and the supporting material, in a dry form, if (1) the α-L-aspartyl-L-phenylalanine-methyl ester used (a) consists of particles formed in spontaneous agglomeration that are in the main smaller than 100 μm and/or of individual particles that are in the main smaller than 50 μm, and (b) has a free bulk density of 350 kg/m$^3$ or lower, and (c) is obtained through, successively, crystallisation of α-L-aspartyl-L-phenylalanine-methyl ester from an aqueous medium with forced convection, granulation and subsequent mechanical reduction of the particles formed, resulting in a fraction having the relevant properties, and (2) that α-L-aspartyl-L-phenylalanine-methyl ester is for a short time brought into contact with particles of the edible supporting material having a particle size of between 20 and 2000 μm, in a weight ratio of at most 1:1, but not less than 1:30, relative to the supporting material, under mild mixing conditions.

In this way a simple method is provided for depositing APM on an edible supporting material, in a way that involves little energy and does not necessitate the use of further additives, auxiliaries or wetting agents. In comparison with physical powder blends containing APM or compositions in which an insufficient amount of APM is deposited on a supporting material, the compositions obtained have a lower angle of repose and improved flow properties; they moreover involve virtually no risk of dusting and drifting and show only a very small tendency to adhere to walls and the like. Depending on the supporting material chosen, they may contain up to at most 50 wt. % APM on the support. The compositions obtained according to the invention also show excellent dissolution behaviour.

DETAILED DESCRIPTION OF THE INVENTION

Via the present method extremely homogeneous and suitable compositions, in which the greater part of the APM is deposited on the edible supporting material, are obtained within a very short time, for example within 0.5 to 20 minutes already, and with only little energy consumption. A particular advantage of the present method is that it results in excellent compositions, in which high concentrations of APM are entirely or almost entirely bound to the supporting material, also under very dry conditions, for example in the case of a low relative humidity (for example <70% or even at 40% or lower) or in the case of the use of non-hygroscopic or slightly hygroscopic supporting materials.

It has been found that the method according to the invention presents the further advantage that the compositions (originally) obtained containing relatively high concentrations of APM bound to supporting material can be converted, in a simple manner, via one or more additional simple mixing operations, requiring little energy, with extra supporting material—whether or not in the presence of additional colourings, flavourings and/or other ingredients required for specifically desired end products—, into homogeneous compositions with lower, or even very low, e.g. 0.5 to 5 wt. %, APM concentrations, in which the APM is bound to the supporting material, without adversely affecting the composition's properties in terms of flow and dissolution behaviour and in terms of its low risk of dusting and drifting and the like. In that further processing the compositions originally obtained, containing relatively high concentrations of APM bound to supporting material, may, as it were, be regarded as a kind of master batch or pre-mix of supported APM. The weight ratio of the composition originally obtained and the further supporting material is preferably between 1:1 and 1:20.

A final advantage of the present method that may be mentioned is that the mixing operation according to the invention involves few risks of so-called overmixing, because of the mild conditions employed. 'Overmixing' is understood to be the phenomenon of the secondary segregation of an already well-mixed composition when the actual mixing time is for some reason or other longer than the time strictly required for the mixing. Powder compositions that show the tendency to segregate secondarily at longer mixing times are also known as segregation powders. When no segregation takes place the powders are also known as cohesive powders. The compositions obtained according to the method of the invention may hence be regarded as cohesive powders. For further information on the behaviour of cohesive and segregation powders reference is also made to N. Harnby et al., in "Mixing in the Process Industries", 2nd Ed. 1992, pages 10–16, Butterworth & Heinemann Ltd, Oxford. A person skilled in the art sometimes also distinguishes between cohesive powder (blend)s and free-flowing powder(blend)s; the flow behaviour of the compositions obtained via the present method is to a great extent determined by the supporting material's particle size and character and will often be free-flowing.

The APM that can be used in the method according to the invention may be any solid APM that consists of particles formed in spontaneous agglomeration that are in the main smaller than 100 μm and/or of individual particles that are in the main smaller than 50 μm, insofar as it is obtained through crystallisation, from an aqueous medium, with forced convection, followed by granulation and drying, and further processing to obtain a fraction of APM particles with a free bulk density of 350 kg/m$^3$ or lower. 'Spontaneous agglomeration' is in this patent understood to mean that small APM particles spontaneously agglomerate, in a dry form, without any need for a specific process step. 'In the main smaller than 100 μm' is here understood to mean that at least 99 wt. % of the APM particles (including the agglomerates) is not larger than 100 μm.

The particle size of the APM obtained after crystallisation, separation, drying, granulation and reduction, which is used in the method according to the present invention, is such that at least 99 wt. % of the particles, including those formed in spontaneous agglomeration, is <100 μm, at least 85 wt. % of the particles preferably being <80 μm. Preferably, 99 wt. % of the particles is <80 μm, with at least 85 wt. % of the particles being <60 μm; in particular, 99 wt. % of the particles is <50 μm and most preferably 99 wt. % of the particles is <25 μm. If the APM that is used in the method according to the invention consists entirely or partly of APM agglomerates, those APM agglomerates must consist of individual APM particles that are in the main smaller than 50 μm, preferably <40 μm, and particularly preferably <25 μm. Exceptionally good results are obtained with such APM products. The best results in terms of little risk of drifting, dissolution time, flow behaviour and the like are obtained when the APM used has a particle size that is in the main <25 μm.

As the supporting material in the method according to the invention use may be made of a wide group of known, solid food ingredients that are used in combination with intensive sweeteners, for example as bulking agents. Examples of such ingredients are monosaccharides, such as glucose, which is also referred to as dextrose or grape sugar, and fructose; disaccharides, such as saccharose, which is not only referred to as sucrose but also as cane or beet sugar, lactose and maltose; oligosaccharides such as stachyose or raffinose; polysaccharides, such as starch, maltodextrins, cyclodextrins, fructanes, including for example inulin (polyfructose) and polydextrose; sugar alcohols, such as sorbitol, mannitol, maltitol, lactitol, xylitol and isomalt; and also other carbohydrates and polyols; several of the aforementioned products are also available in a hydrated form, for example dextrose monohydrate; food acids such as lactic acid, apple acid, citric acid or salts of such edible acids, or protein hydrolysates and other dry nutrients such as vanilla and the like may also be used as the supporting material.

The solid supporting material that is usually used in the method according to the invention usually has a particle size with a relatively narrow spread, for example a maximum difference of about 500 μm between the 10% largest particles and the 10% smallest particles, within the overall range from 20 to 2000 μm. Supporting material with which at least 90 wt. % of the product lies in the range from 20 to 500 μm is most preferable. Depending on the nature of the supporting material, products having such a particle size are already available as such in commercially available products, or can be simply separated as a particle size fraction from commercially available products, via methods known to a person skilled in the art, for example by sieving, optionally preceded by a grinding operation. In the case of various supporting materials, for example citric acid or maltodextrins, it is also possible to use the supporting material with a particle size larger than 500 μm, for example from about 1200 to about 2000 μm.

It is preferable to choose the supporting material's particle size distribution such that it is narrower than the aforementioned range of 20 to 2000 μm, or indeed even narrower than the aforementioned range of 20 to 500 μm. In the case of narrower particle size ranges, for example such that at least 80 wt. % of the supporting material falls within a range whose upper and lower limits differ by not more than 200 μm, an even more homogeneous product is obtained in terms of the sweetening power of the individual particles and in terms of the composition's outer appearance. The flow behaviour will then usually be better too.

It is in fact also possible to use a blend of different supporting materials as the supporting material. Before being used in the method according to the invention, the supporting material may already be mixed with the total amount or with a portion of one or more colourings or flavourings which must be present in a desired end product sweetened with APM. Depending on the supporting material chosen, for example with respect to its hygroscopicity, and the additives that are optionally to be used, such as colourings and flavourings, minor adjustments may be required in the recipe for the processing into the supported APM. A person skilled in the art will be able to find such minor adjustments easily, via an adequate choice of process conditions and equipment. The classification and testing method proposed in Pharmeuropa, Vol. 4 (3), pp. 228–230, 1992, provides a good impression of the hygroscopicity of the supporting materials used. According to that classification, materials that absorb more than 15% moisture on exposure, at 25° C., to air with a relative humidity (r.h.) of 79% are called very hygroscopic materials. Such materials can be used as a supporting material in the context of the present invention, but it is assumed that in such cases adhesion to the supporting material will only take place under the influence of available moisture, which is in other words comparable with methods known from the state of the art in which use is made of wetting.

The materials that absorb between 2 and 15% moisture are called hygroscopic; those that absorb less than 0.2% moisture are called non-hygroscopic. Materials that absorb 0.2–2% moisture (at 25° C., 79% r.h.) are said to have a slightly hygroscopic character. The less hygroscopic the supporting material, the most apparent the advantages of the present invention will be. They will also be apparent if the method is carried out at a relatively low r.h., for example lower than 70%. Particularly hygroscopic supporting materials are in fact usually less suitable for so-called "dry-substance" applications, for example in instant powdered drinks, etc., so, in practice, not using such materials will not impose any real limitations on the invention's applicability. Supporting materials that are suitable for use include at least materials with a hygroscopicity like that of sorbitol or lower, for example—but certainly not exclusively—xylitol, maltitol, saccharose, isomalt and lactitol.

As already described above, the APM that can be used in the method according to the invention must be obtained, inter alia, through crystallisation from an aqueous medium with forced convection. Methods for crystallisation of APM with forced convection are known as such to a person skilled in the art; in the context of the present invention there are no exceptions to these methods, providing that they are carried out in an aqueous medium. The APM can also be obtained through neutralisation crystallisation from corresponding salts, such as APM.HCl salt. 'Aqueous medium' is in this context understood to be water or water that contains a limited concentration, up to for example at most 25 wt. %, of a lower alcohol ($C_1$–$C_3$). The forced convection can for example be realised via circulation of (part or all of) the solution used for crystallisation, or by keeping the solution used for crystallisation in motion by stirring or otherwise. The crystallisation can be effected for example via direct or indirect cooling, or by removing the aqueous solvent through evaporation. Of course, APM that has been obtained via crystallisation without forced convection (i.e. obtained via so-called static crystallisation) can also be converted into APM that is usable in the context of the present method, via recrystallisation with forced convection.

The solid APM that is formed in the crystallisation can then be separated from the remaining aqueous medium in any manner known to a person skilled in the art and then be dried and granulated, also in a known manner, and then be reduced, for example by grinding. Examples of drying methods that are suitable for use are: fluid-bed drying, microwave drying, vacuum drying, etc. Examples of granulation methods that are suitable for use are wet granulation, compacting granulation, etc. The sequence of the drying and granulation is not important, providing that the dried, granulated and reduced APM obtained has a free bulk density in the order of 350 kg/m³ or lower. The drying and granulation may also be combined in one process, for example by using a high-speed paddle dryer (HSPD). If the greater part, i.e. at least 85 wt. %, of the particle size distribution of the APM that is then obtained does not yet fall within the relevant limits, an APM fraction that does meet the particle size distribution criteria must first be provided, for example via grinding, before using the method according to the invention. Various methods are available to a person skilled in the art for this purpose; the simplest is separation into a screen fraction having the desired upper limit and/or grinding. The reduction (optionally via a grinding operation) can be carried out with the aid of for example a stud-type crusher or a ball mill. The dried, granulated and subsequently reduced APM thus obtained usually has a free bulk density in the order of 350 kg/m³ or lower.

The free bulk density (or FBD) is determined according to ASTM D1895-89 (1990).

The supporting material and the APM that are used in the method of the invention are both used in a dry form. In the case of APM 'dry form' is understood to mean that up to at most 4.5 wt. % moisture (via the loss-on-drying method (LOD): 4 hours' heating to 105° C.) is present in or on the APM. It is difficult to give a general rule for the moisture content of the supporting materials, because of the great diversity of supporting materials that may be used. As a rule of thumb, the moisture contents quoted by the producers in the product specifications can be used as the upper limit; they may even show values up to 15 wt. %. Another rule of thumb that can be used is that the supporting material used shows no visible adhering moisture and feels dry. As already mentioned, certain supporting materials may also be used in a hydrated form. By way of example it may be mentioned here that substances like dextrose monohydrate have a moisture content of approx. 9.1 wt. % and Maltrin-M500 (registered trademark) may contain approx. 13 wt. % water and may still feel dry.

The weight ratio of the APM and the supporting material is not very critical in the method according to the invention. If the weight ratio of the APM and the supporting material is relatively low, not all the particles of the supporting material will be entirely occupied with APM, but almost all, that is, often more than 95 wt. %, but at least 85 wt. % of the APM, will be bound to the supporting material. This can be simply observed visually, for example beneath a microscope. If the weight ratio of the APM and the supporting material is too high, for example >1, it will be impossible for all the APM to be bound to the supporting material. More than 50 wt. % of the APM particles, at least, will remain in the composition as free product, which is considered insufficient with respect to the product properties, such as flow properties, (in)homogeneity of the product (and the associated risks of segregation) and drifting problems. In that case the dissolution time of the APM is also adversely affected. All this means that the method according to the invention will result in compositions of sufficient quality in a range of the weight ratio of the APM and the supporting material of up to at most 1. With the method according to the invention the weight ratio of the APM and the supporting material is hence usually at most 1:1 and at least 1:30. If the weight ratio of the APM and the supporting material is smaller, it is recommended to choose a slightly longer mixing time, within the usual range of mixing times between 0.5 and 20 minutes. The weight ratio is preferably in the range from 1:3 to 1:8, because that usually results in excellent compositions, in which at least 85 wt. % of the APM is bound to the supporting material. This means that a degree of loading of the support that clearly exceeds 10 wt. % is well feasible.

With the method according to the invention the APM is brought into contact with supporting material under mild mixing conditions, without high energy input, for a short length of time, for example 0.5 to 20 minutes. Actually, no segregation takes place at longer mixing times either. The type of mixer to be used is not critical, but preferably use is made of mixers such as tumbler mixers or ribbon blenders. Such mixers involve no or virtually no risk of particle reduction with dust formation, and the APM continues to adhere well to the supporting material after the mixing process. Such a mixing process can be simply imitated on a laboratory scale by stirring the APM and the supporting material with a spatula, for example for 5 minutes.

The advantages of the method according to the invention are particularly evident if the method is carried out under conditions under which moisture cannot or can hardly affect the binding of the APM to the edible supporting material. This is the case in particular if the mixing process is carried out under conditions of a low relative humidity (r.h.), for example of 70% or lower, or even at 40% r.h. or lower, using very dry supporting materials. It is assumed that at a higher r.h., or in the case of the use of very hygroscopic substances, an important portion of the adhesion of the APM to the supporting material is also caused by the formation of water bridges or something similar. Such a binding mechanism is not possible at a low r.h. and in the case of dry products. Under those conditions in particular, the method according to the invention differs from processes in which use is made of APM having different specifications. This is very surprising.

The invention will hereinafter be elucidated with reference to some examples and comparative experiments, without being in any way whatsoever limited thereby.

Where relevant, use was made of the following techniques, methods and equipment:

The results obtained in terms of the deposition of the APM on the supporting material were estimated by means of morphological analysis under a Moritex inspection microscope, consisting of a videomicroscope plus monitor; the microscope was fitted with a step-by-step adjustable zoom lens with magnifications of 35×, 50×, 75×, 100×, 125×, 150× and 210×; the samples were examined with the aid of obliquely incoming halogen light. The exposures at 35×, 100× and 210× give a good overall survey, a detailed image and an impression of the smallest particles, respectively. On the basis of such exposures it is possible to estimate whether 0–15, 15–50, 50–85 or >85% of the APM is bound to the supporting material. In Table 1 included below this is indicated via + and − codes.

The dissolution time of the APM was determined with the aid of an in-line UV spectrophotometer: the change in UV absorption at 254 nm was followed in time until a stable level was reached when 0.5 gram (APM content) of a sample was added to 500 ml of stirred demineralised water that was free of dust and particles (pH=7; temperature 23° C.), in a 1000-ml American model beaker (vortex depth 2.5 cm). The dissolution time was determined in minutes. To what extent the dissolution times of the APM in the compositions are shorter or longer than those of the starting product is indicated in Table 2 included below via + and − codes.

The flow properties of the compositions obtained can be determined by determining the angle of repose, according to DIN ISO 4324. A lower angle of repose usually implies an improvement of the flow behaviour, which may for example be important in dosing a product to some system from a hopper. In such cases better flow behaviour also implies a reduction in the risk of bridge formation.

The following starting materials were used in the following examples and comparative experiments:

A1. APM obtained through stirred crystallisation; except for drying to 3 wt. % moisture no further treatments; particle size range 10–200 $\mu$m; free bulk density 176 kg/m$^3$. Microscopic research showed that the particles were in part the result of spontaneous agglomeration.

A2. APM obtained through stirred crystallisation, followed by granulation and drying and fractioning; two products were prepared, which had the following properties (moisture content, particle size range, free bulk density): A2a.: 3.0%, 200–700 $\mu$m, 525 kg/m$^3$ A2b.: 2.5%, 50–250 $\mu$m, 475 kg/m$^3$. Microscopic research showed that the particles were in part the result of spontaneous agglomeration.

A3. APM obtained through stirred crystallisation; granulation and drying, followed by reduction via grinding;

six products were obtained which were characterised as follows in terms of moisture content (LOD), particle size distribution (p.s.d.) and free bulk density (FBD). Microscopic research has shown that the particles were in part the result of spontaneous agglomeration.

|      | LOD (%) | <80 μm (%) | <50 μm (%) | <20 μm (%) | FBD kg/m³ |
|------|---------|------------|------------|------------|-----------|
| A3a. | 3.4     | 96.6       | 95         | 51         | 223       |
| A3b. | 2.5     | 91         | 80         | 43         | 283       |
| A3c. | 3.0     | 98.8       | 98         | 55         | 218       |
| A3d. | 2.7     | 98         | 95         | 57         | 259       |
| A3e. | 2.6     | 100        | 98         | 58         | 289       |
| A3f. | 3.4     | 95         | 85         | 52         | 238       |
| A3g. | 4.5     | 100        | 100        | 97         | 161       |

A4. APM obtained through static crystallisation; no further treatments except for drying; two products were obtained, which were characterised as follows in terms of LOD, p.s.d. and FBD:

|      | LOD (%) | <80 μm (%) | <50 μm (%) | <20 μm (%) | FBD kg/m³ |
|------|---------|------------|------------|------------|-----------|
| A4a. | 2.4     | 100        | 100        | 95         | 237       |
| A4b. | 2.5     | 100        | 95         | 50         | 344       |

A5. APM obtained through static crystallisation, followed by wet granulation and drying, resulting in a product that was characterised in terms of LOD, p.s.d. and FBD:

|     | LOD (%) | <250 μm (%) | <50 μm (%) | <20 μm (%) | FBD kg/m³ |
|-----|---------|-------------|------------|------------|-----------|
| A5. | 3.4     | 99          | 2          | 1          | 592       |

A6. APM obtained through static crystallisation; wet granulation and drying, followed by reduction via grinding; a product was obtained that was characterised as follows in terms of LOD, p.s.d. and FBD:

|     | LOD (%) | <80μ (%) | <50μ (%) | <20μ (%) | FBD kg/m³ |
|-----|---------|----------|----------|----------|-----------|
| A6. | 3.5     | 100      | 100      | 80       | 232       |

B1. Dextrose monohydrate; moisture content 9.2 wt. %, particle size 10–300 μm (of which 32% <100 μm, 50% 100–200 μm, 12% 200–250 μm and 6% >250 μm).

B2. Citric acid; moisture content <0.1 wt. %, particle size 100–500 μm (of which 0.4% <100 μm, 7.2% 100–200 μm, 50.2% 200–300 μm, 42.1% >300 μm and 0.3% >500 μm).

B3. Maltodextrin; dextrose equivalent ("DE value") 10–15; moisture content 5.6 wt. %; particle size 10–300 μm (of which 10% <20 μm, 16% 20–50 μm, 16% 50–80 μm, 16% 80–100 μm, 33% 100–200 μm, 5% 200–250 μm and 4% >250 μm).

In the examples (i.e. those experiments in which one of the A3 products was used) and the other, comparative, experiments 1 part by weight APM and the indicated number of parts by weight supporting material were in each case mixed. this was done (at room temperature and a r.h. of 40–50%) either by stirring for 5 minutes with a spatula in a polyethylene sample bottle, or by mixing for 20 minutes in a 4-litre laboratory ribbon blender (Pfleiderer) at 40 rpm, or by mixing for 10 minutes in a tumbler mixer (50 rpm) under atmospheric conditions and a prevailing r.h. of 50–85%. The resultant compositions were then inspected with the aid of a Moritex inspection microscope to determine morphological aspects. It was then easy to estimate whether, and to what extent, the APM had been deposited on the supporting material or to what extent loose APM particles or APM agglomerates were still present. The compositions obtained were also subjected to other tests, as described above, insofar as is evident from the tables.

The results of the various experiments and comparative experiments are summarised below, in tabular form, in terms of:

1. microscopic assessment of the amount of APM deposited on the support: Table 1. The estimates included in this table are indicated by + of – as follows:
   - −− no APM whatsoever has been deposited on the supporting material
   - − less than about 15% of the APM has been deposited on the support
   - +/− approx. 15–50% of the APM has been deposited on the support
   - + approx. 50–85% of the APM has been deposited on the support
   - ++ 85% or more of the APM has been deposited on the support.

2. Assessment of the dissolution time of the APM in the composition relative to the dissolution time of the APM starting product: Table 2. The indication of the findings, summarised in Table 2, is based on a comparison of the dissolution times of 0.5 gram of APM in the starting product and in the composition, as follows:
   - −− the dissolution time in the composition is much longer (2× or more)
   - − the dissolution time in the composition is longer (1.1–2×)
   - +/− the dissolution time in the composition is the same (0.9–1.1×)
   - + the dissolution time in the composition is shorter (0.5–0.9×)
   - ++ the dissolution time in the composition is much shorter (0.5× or less).

All the experiments and comparative experiments mentioned in Tables 1 and 2 were carried out at 40–50% r.h. The experiments marked with an * were carried out both via spatula mixing and with the aid of a ribbon blender. No differences in results were found.

TABLE 1

|     | A:B mixing ratio | B1   | A:B mixing ratio | B2  | A:B mixing ratio | B3  |
|-----|------------------|------|------------------|-----|------------------|-----|
| A1  | 1:5              | +/−  | 1:5              | +/− |                  |     |
| A2a | 1:5              | −−   | 1:5              | −−  | 1:5              | −−  |
| A2b | 1:5              | −−   | 1:5              | −−  | 1:5              | −−  |
| A3a | 1:1              | +/++ |                  |     | 1:1              | +   |
|     | 1:3              | ++   |                  |     | 1:3              | ++  |
|     | 1:5              | ++   |                  |     | 1:5              | ++  |
|     | 1:7              | ++   |                  |     | 1:8              | ++  |
| A3b | 1:5              | ++   | 1:1              | +   |                  |     |

TABLE 1-continued

|     | A:B mixing ratio | B1 | A:B mixing ratio | B2 | A:B mixing ratio | B3 |
|-----|------|-----|------|-----|------|-----|
|     |      |     | 1:3  | ++  |      |     |
|     |      |     | 1:5  | ++  |      |     |
|     |      |     | 1:8  | ++  |      |     |
| A3c | 1:5 * | ++ |      |     | 1:5 * | ++ |
|     | 1:5 * | ++ |      |     | 1:5 * | ++ |
|     | 1:5 * | ++ |      |     | 1:5 * | ++ |
|     | 1:5 * | ++ |      |     | 1:5 * | ++ |
|     | 1:5 * | ++ |      |     | 1:5 * | ++ |
| A3d |      |     |      |     |      |     |
| A3e |      |     |      |     |      |     |
| A3f |      |     |      |     |      |     |
| A3g |      |     |      |     |      |     |
| A4a | 1:5  | –   |      |     | 1:5 * | – |
| A4b |      |     | 1:5  | +/– | 1:5  | – |
| A5  | 1:5  | ––  |      |     | 1:5  | –– |
| A6  | 1:5 * | +/– |     |     |      |     |

TABLE 2

|     | A:B mixing ratio | B1 | A:B mixing ratio | B2 | A:B mixing ratio | B3 |
|-----|------|-----|------|-----|------|-----|
| A2a | 1:5  | +/– | 1:5  | +   | 1:5  | –   |
| A2b | 1:5  | +   | 1:5  | +   | 1:5  | –   |
| A3a | 1:5  | ++  |      |     | 1:1  | +   |
|     |      |     |      |     | 1:3  | ++  |
|     |      |     |      |     | 1:5  | ++  |
|     |      |     |      |     | 1:8  | ++  |
| A3b | 1:5  | ++  | 1:1  | +   |      |     |
|     |      |     | 1:3  | ++  |      |     |
|     |      |     | 1:5  | ++  |      |     |
|     |      |     | 1:8  | ++  |      |     |
| A3c | 1:5  | ++  |      |     |      |     |
| A3d | 1:5  | ++  |      |     |      |     |
| A3e | 1:5  | ++  |      |     |      |     |
| A3f | 1:5  | ++  |      |     |      |     |
| A3g | 1:5  | ++  |      |     |      |     |
| A4a | 1:5  | +/– |      |     |      |     |
| A4b | 1:5  | +/– | 1:5  | +/– |      |     |
| A5  | 1:5  | –   |      |     |      |     |
| A6  | 1:5  | [...] |    |     |      |     |

Moreover, a few experiments were carried out in a tumbler mixer. To that end a homogeneous blend of equal volumes of products A3a, A3b, A3c and A3d was first made. Portions of that blend, of 1.0 kg each, were then mixed, in a tumbler mixer (Indola, type KVBV415AC, 3.8 litres) at 50 rpm for 10 minutes, with each of the supporting materials B1, B2 and B3 (in an APM:support weight ratio of 1:5). In each case compositions with excellent flow properties were obtained, which showed no dusting or drifting problems.

One of the compositions obtained (that containing B2) was then used as a pre-mix and was mixed with a five-fold amount of B1 for 10 minutes in the same tumbler mixer. Morphological research using the Moritex inspection microscope showed that almost all the APM in the composition thus obtained was bound to the supporting material, and was proportionally distributed between the B2 and B1 support particles. The ultimate blend had excellent flow properties and showed no dusting or drifting problems.

What I claim is:

1. A method for depositing on an edible supporting material α-L-aspartyl-L-phenylalanine-methyl ester (APM) having a particle size that is in the main smaller than 100 μm, comprising:
mixing the α-L-aspartyl-L-phenylalanine-methyl ester and the edible supporting material in a dry form, wherein (1) the α-L-aspartyl-L-phenyl-alanine-meythyl ester used (a) consists of particles formed in spontaneous agglomeration that are in the main smaller than 100 μm and/or of individual particles that are in the main smaller than 50 μm, and (b) has a free bulk density of 350 kg/m$^3$ or lower, and (c) is obtained through successively, crystalilsation of α-L-aspartyl-L-phenylalanine-methyl ester from an aqueous medium with forced convection, granulation and subsequent mechanical reduction of the particles formed, and (2) the α-L-aspartyl-L-phenylalanine-methyl ester is mixed under mild mixing conditions with particles of the edible supporting material having a particle size of 20 to 2000 μm at a weight ratio of not less than 1:30 and up to 1:1 relative to the edible supporting material.

2. A method according to claim 1, wherein the α-L-aspartyl-L-phenylalanine-methyl ester has a particle size that is in the main smaller than 80 μm.

3. A method according to claim 1, wherein the α-L-aspartyl-L-phenylalanine-methyl ester has a particle size that is in the main smaller than 50 μm.

4. A method according to claim 1, wherein the α-L-aspartyl-L-phenylalanine-methyl ester has a particle size that is in the main smaller than 25 μm.

5. A method according to claim 1, wherein the edible supporting material is at least one selected from the group consisting of monosaccharides, disaccharides, oligosaccharides, polysaccharides, sugar alcohols, carbohydrates and polyols, food acids and their salts, protein hydrolysates and vanilla.

6. A method according to claim 5, wherein the difference between 10% of the largest particles and the 10% of the smallest particles of the edible supporting material does not exceed 500 μm.

7. A method according to claim 1, wherein at least 80 wt. % of the supporting material falls within a particle size range whose upper and lower limits do not differ by more than 200 μm.

8. A method according to claim 1, wherein the α-L-aspartyl-L-phenylalanine-methyl ester and supporting material are mixed in a weight ratio in the range from 1:3 to 1:8.

9. A method according to claim 1, wherein the mixing in a dry form is done at a relative humidity of 70% or lower.

10. A method according to claim 1, wherein the edible supporting material used in the method comprises at least one bulking agent.

11. A method according to claim 1, wherein the mixing is conducted for 0.5 to 20 minutes.

12. A method according to claim 10, wherein the α-L-aspartyl-L-phenylalanine-methyl ester has a particle size that is in the main smaller than 25 μm.

13. A method according to claim 1, wherein said edible supporting material contains at least one member selected from the group consisting of colorings and flavorings.

14. A method according to claim 1, wherein said method further comprises contacting the composition obtained according to claim 1 with an additional amount of edible supporting material under mild mixing conditions, at a weight ratio of the composition obtained from claim 1 to further supporting material in the range of 1:1 to 1:20.

15. A method according to claim 14, wherein said method is conducted at a relative humidity of 70% or less.

16. A method for depositing α-L-aspartyl-L-phenylalanine-methyl ester (APM) having a particle size that is in the main smaller than 100 μm, to obtain a cohesive powder on a supporting material comprising:

mixing the α-L-aspartyl-phenylalanine-methyl ester and the supporting material in a dry form, under mild mixing conditions for up to about 20 minutes, wherein (1) the α-L-aspartyl-L-phenyl-alanine-methyl ester used (a) consists of particles formed in spontaneous agglomeration that are in the main smaller than 100 μm and/or of individual particles that are in the main smaller than 50 μm, and (b) has a free bulk density of 350 kg/m$^3$ or lower, and (c) is obtained through successively, crystallisation of α-L-aspartyl-L-phenylalanine-methyl ester from an aqueous medium with forced convection, granulation and subsequent mechanical reduction of the particles formed; (2) the supporting material comprises particles of at least one solid food ingredient, said particles having a particle size of 20 to 2000 μm; and (3) the α-L-aspartyl-L-phenylalanine-methyl ester and edible supporting material are mixed in a weight ratio of not less than 1:30 and up to 1:1 relative to the supporting material.

* * * * *